ated Oct. 4, 1960

2,955,055

HEAT-CONVERTIBLE COATING COMPOSITION, ENAMELED ARTICLE, AND METHOD OF FINISHING SURFACE WITH SAID COMPOSITION

Louis C. Souder, Levittown, and Sidney Melamed, Philadelphia, Pa., assignors to Rohm & Haas Company, Philadelphia, Pa., a corporation of Delaware No Drawing. Filed Apr. 25, 1958, Ser. No. 730,788

15 Claims. (Cl. 117—75)

This invention relates to heat-convertible coating compositions or baking enamels, coated articles, and enamel finishing. It is particularly concerned with new compositions based on certain methacrylate copolymers and adapted to be applied by commercial spraying techniques. It is also concerned with the finishing of surfaces, especially of metals, with the compositions of the present invention.

An object of the invention is to provide a heat-convertible coating composition based on copolymers of methyl methacrylate which composition produces cured coatings having good gloss, hardness, and excellent adhesion to bare or primed metals. Another object is to provide a heat-convertible methyl methacrylate co-polymer-containing coating composition which produces cured coatings which are resistant to swelling and are insoluble in solvents for the initial uncured polymer. Another object is to provide a heat-convertible methyl methacrylate copolymer-containing coating composition which produces cured coatings which have good resistance to staining, particularly by foodstuffs, medicines, and the like, e.g., ketchup, iodine, grapejuice, and bluing. Another object is to provide a heat-convertible methyl methacrylate copolymer-containing coating composition which produces cured coatings having good resistance to soaps and other alkaline cleansers. Another object is to provide a heat-convertible methyl methacrylate copolymer-containing coating composition which produces cured coatings having good resistance to ultra-violet exposure, and resistance to exposure to elevated temperatures, such as may be encountered in the vicinity of radiators, stoves, and heaters, and having negligible flow at such elevated temperatures so that the coatings have good so-called "print-resistance" by which is meant resistance to deformation under pressure, even under such elevated temperatures.

Poly(methyl methacrylate) is highly regarded as a coating material because of its resistance to staining and its durability, particularly its high retention of gloss, and color when pigmented, during prolonged outdoor exposure. Because of this quality, it has long been desired to use poly(methyl methacrylate) compositions for the finishing of household appliances and automobile bodies as well as other metallic articles subject to outdoor exposure. However, such compositions have poor adhesion to metals directly and also poor adhesion to coatings obtained from primers of the "baking" type. While their adhesion to such primers can be somewhat improved by roughening of the exposed surface of such primer coatings, as by a sanding operation, and such roughening is frequently resorted to in any event to improve adhesion, the improvement thereby obtained is not as pronounced as desired nor is it practical to roughen the primer in all of the indentations that are present in such structures as automobile bodies.

Attempts have heretofore been made to improve the adhesion of methyl methacrylate compositions by incorporating acrylamide or methacrylamide as a component of the copolymer. However, the incorporation of one of these unsaturated amides even in small proportions such as from about 1 to 3 mole percent gives rise to extremely viscous solutions in the organic solvents that have heretofore been used when the desired range of molecular weight of the copolymer for producing proper flexibility, toughness, and durability is employed. It has been heretofore proposed to include in the composition certain cross-linking agents such as formaldehyde or simple urea-formaldehyde resins. However, the compositions thus obtained have the same viscosity difficulties mentioned and have also been troubled by limited compatibility with the previously used cross-linking agents giving rise to hazy coatings. In addition, worthwhile improvement in adhesion directly to metals was not obtained.

In accordance with the present invention, a composition having good application properties and outstanding adhesion directly to metals or to baked primers is provided. This composition comprises a copolymer of methyl methacrylate with 2.5 to 8 mole percent of acrylamide or methacrylamide, preferably 3 to 5 mole percent of the amide. Of course, a mixture of the amides may be copolymerized instead of a single one of the two. This composition also comprises, as a cross-linking agent, either N,N'-dimethoxymethyl-N,N'-ethyleneurea or N,N'-bis-methoxymethyluron. In order to provide a composition, containing the copolymer and one of the cross-linkers, which has appropriate viscosity to enable the composition to be sprayed when the copolymer has the proper molecular weight, a solvent system is employed which comprises two components. One component is a member selected from the group consisting of toluene, xylenes, and 2-ethoxyethyl acetate, and the other is the monomethyl ether of ethylene glycol. It is essential that the proportion of acrylamide or methacrylamide should not exceed 8 mole percent since compositions containing substantially over that amount have excessive viscosities even in the solvents disclosed herein. Prior to use in coating, maleic acid or certain mono-salts thereof described hereinafter are added to serve as a catalyst.

The copolymer may contain besides the proportion of acrylamide or methacrylamide specified above and the essential methyl methacrylate component, an appreciable proportion of an alkyl acrylate in which the alkyl group has 1 to 2 carbon atoms or of another alkyl methacrylate in which the alkyl group has 2 to 4 carbon atoms. When ethyl methacrylate is employed, it may amount to as much as ½ the total methacrylate content on a molar basis. When any of the other acrylates or methacrylates are used, they may be present in an amount up to 30 mole percent of the total ester content. The copolymer may also contain small amounts up to 2% of acrylic acid, methacrylic acid, or itaconic acid, and it may contain up to 10 mole percent of acrylonitrile or methacrylonitrile.

The viscosity average molecular weight of the methacrylate polymers may be in the range of 40,000 to 100,000 and preferably between 40,000 and 70,000. By using copolymers in these ranges and especially in the latter preferred range, it is possible to produce sprayable enamels of high solids, such as from about 12 to 20% by weight of non-volatile solids concentration. The copolymers may be prepared by granular, emulsion, or solution polymerization of the several comonomers and, if desired, a portion having a preferred narrow range of molecular weight may be extracted from the products of such polymerization procedures by preferential solvent techniques in accordance with well-known practice. A preferred method of preparing the copolymers involves introducing suitable proportions of the comonomers with a solvent which may be a solvent for both the monomers and the copolymer and with a catalyst, such as one of the well-known organic peroxide catalysts, such as benzoyl peroxide, or one of the well-known azo catalysts, such as α,α'-azodiisobutyronitrile, into a reaction vessel in which the mixture is heated with continuous agitation for a period of 2 to 9 hours followed by cooling. Desirably, toluene, xylene, or 2-ethoxyethyl acetate or the monomethyl ether of ethylene glycol may be employed as a solvent. Mixtures thereof may also be used as the polymerization medium. In order to produce molecular weights in the range of 40,000 to 100,000, the amount of benzoyl peroxide may be from 0.3% to 1% by weight of the monomers and the temperature may be from about 100° to 120° C. When an azo catalyst is employed, such as that mentioned, it is used in an amount of 0.4% to 1.3% by weight of the total weight of monomers at a temperature of about 75° to 85° C. The initial monomer concentration may be about 30% to 60% by weight.

After polymerization, the solution of the copolymer obtained may be cut back to proper concentration for application which can be effected in any suitable manner, such as by spraying, dipping, or casting. Assuming that toluene, xylene, or 2-ethoxyethyl acetate were employed in the polymerization, the dilution may be effected with the monomethyl ether of ethylene glycol in order to produce on dilution a solution which is of sprayable viscosity and adequate solids content to produce a reasonably thick coating in a single spraying step. It is essential that the solvent contain 5% to 20% of the monomethyl ether of ethylene glycol. The particular proportion of this ether that is used within this range depends upon the amount of acrylamide of methacrylamide in the copolymer; the higher the proportion of the amide, generally the higher the proportion of the ether in the solvent system.

The proportion of the cross-linking agent is about 10% to about 20% by weight, based on the weight of the copolymer. Over 20% of this agent tends to produce a softened product unless unusually extended or prolonged baking times are employed. Normal baking time for the enamel of the present invention is about 10 to 45 minutes at temperatures ranging from about 350° F. to 250° F. A period of about 10 to 25 minutes is generally used at the higher portion of the temperature range, 15 to 45 minutes may be employed at 300° F., and somewhat longer times may be employed at 250° F. though generally 40 to 45 minutes is adequate at this temperature. The use of less than 10% by weight of the cross-linking agent is capable of insolubilizing the enamel and does impart somewhat improved adhesion but outstanding adhesion requires a minimum of 10% by weight thereof.

While many acid catalysts are effective to harden or insolubilize the enamel and coatings, maleic acid or a mono-salt thereof with a tertiary amine of a volatile character is outstanding in several respects. In the first place, when one of these catalysts is used, the insolubilization is accompanied with exceptional adhesion of the coating to substrates and particularly to metals. In addition, the compositions retain good stability so that they can be stored many months without noticeable change and they are resistant to mechanical action so that they can be pigmented by grinding on various types of mills even after incorporation of the catalyst. Examples of tertiary amines whose maleic acid mono-salts may be used include trimethylamine, triethylamine, benzyldiethylamine, ethyldimethylamine, diethylmethylamine, diethylpropylamine, triethanolamine, N-methylmorpholine, N-methylpiperidine, N,N'-dimethylpiperazine, and dimethylbutylamine.

Other catalysts such as p-toluenesulfonic acid and butyl acid phosphate will insolubilize the coatings but give poor adhesion. The unique capacity of the maleic acid catalyst to provide outstanding adhesion of the baked coating to a wide variety of substrates and particularly bare metal, is surprising and unexpected, particularly in view of the behavior of the other commonly employed catalysts just mentioned. Such dibasic acid catalysts as fumaric acid, aconitic, and itaconic acid are less desirable than maleic acid for one or more reasons such as unavailability, greater cost, poorer adhesion, less solubility in the composition, or slower action, because of which higher baking temperatures or longer times of baking would be needed.

The amount of the maleic acid or salt used is from ½% to 4% by weight of maleic acid content, based on the weight of the copolymer, and is preferably about 1% to 2%.

In compounding the enamel, it is merely necessary to add solvent, the cross-linker, and the maleic acid (or its salt) to the solution of the copolymer obtained from the polymerization procedure. If desired, the maleic acid (or salt) may be dissolved in the monomethyl ether of ethylene glycol and the solution may then be mixed with the polymer solution before or after the cross-linker is added. The solvent used in this composition is characterized by providing not only outstanding compatibility among the various components within the system and proper boiling point range or volatility to render the composition capable of application by spraying as well as by brushing and so on, but also by the fact that the components of the solvent system do not stain or discolor the composition itself or the coated films obtained therefrom. The solvents are readily available and inexpensive, and they have no greater toxicity than that usually associated with conventional poly(methyl methacrylate) solvents.

Substrates to which the enamels may be applied include all sorts of metals such as steel, aluminum, copper, brass, bronze, tin, chromium, wrought iron, as well as substrates of wood, paper, cardboards, textiles, leather, stone, masonry, brick, plastics, glass, asbestos cement shingles or other structures, etc. However, the system of the present invention is particularly valuable for the coating of metals which may or may not be provided with a primer coating. For this reason the description of the invention hereinafter will more particularly refer to the application of the coating compositions of the present invention to metals whether primed or not.

The enamels of the present invention may be applied over a wide variety of baking primer coats used on metals including the drying oil-modified alkyds, rosin-modified alkyds, mixtures of an alkyd and an aminoplast, which may or may not be co-reacted, mixtures of an alkyd and an epoxy resin, which may or may not be co-reacted, mixtures of an alkyd with an aminoplast and with an epoxy resin, which may or may not be co-reacted, mixtures of epoxidized esters of higher fatty acids with an aminoplast resin, which may or may not be co-reacted, and so on.

While, for certain purposes, a clear enamel may be employed, it is quite general to include pigments in an amount up to 120% by weight of the polymer in the finishing compositions of the present invention. Examples of suitable pigments include titanium dioxide, carbon black, iron blues, phthalocyanine blues and greens; metal oxides, hydroxides, sulfides, sulfates, silicates, and chromates; organic maroons, aluminum flake, bronze powders, pearl essence, and various fillers or extenders such as talc, barytes, china clay, and diatomaceous earth.

It will be obvious to those skilled in the organic coating art that the amount of pigment may be varied depending on the effect desired. The amount of pigment, by weight based on the weight of the organic film-forming material, may vary between about 2% for light, high-hiding pigments, such as carbon black, and about 120% for heavy, low-hiding pigments such as lead chromate. The presence of the amide groups in the copolymer has also been found to provide enhanced pigment-dispersing capacity. For example, they facilitate the obtaining of good dispersions of carbon black, which is ordinarily extremely difficult to disperse in a coating based on poly(methyl methacrylate) itself.

It is common practice in the coating art to prepare liquid coating compositions on a commercial basis in a highly concentrated form. In comparison with the same compositoin in a thinned or diluted form ready for application, the concentrated form is more resistant to pigment settling during storage, is cheaper to store and ship because less weight and space are involved, and is in a more adaptable condition for the addition of thinning and/or other modifying materials by the ultimate user to adjust the composition to his own liking. Therefore, the concentrated coating compositions from which the compositions of this invention may be prepared by merely admixing appropriate organic liquids form a part of this invention. The maximum degree of concentration, i.e. the maximum non-volatile solids content, is limited only by the maximum consistency which can be conveniently handled by the manufacturer and the ultimate user. While concentrated compositions having a non-volatile solids content of 75% by weight, or even higher, may be prepared; the normal concentration is usually between 30% and 60%. The minimum concentration is obviously the solids content of the ready-to-spray compositions; but, as previously mentioned, such compositions are not usually prepared by the manufacturer because they are not readily adaptable to adjustment by the user.

The method of grinding or dispersing pigment in the film-forming materials is not critical provided a smooth, uniform dispersion of finely divided pigment is produced. Examples of suitable equipment well known in the art are ball, pebble, buhrstone, roller, and colloid mills, and kneader-mixers, such as Banbury or Werner-Pfleiderer.

The concentrated enamels may be reduced to whatever concentration is suitable for the particular manner of application. The application concentration may vary from about 5% to 40% non-volatile solids (that is, including pigments), depending upon the manner of application and the thickness of coating desired. For spraying, the concentration may be between 10% and 35% solids.

While the preferred enamels of this invention contain, as film-forming materials, the polymers of methyl methacrylate and a cross-linker of the present invention and, if desired, plasticizers therefor, suitable enamels may be also prepared by incorporating other compatible film-forming materials with the aforementioned ingredients. Examples of such additional film-forming materials are cellulose esters and alkyd resins, the choice being dictated by the requirement for compatibility and thermal resistance. Obviously, it is most convenient to incorporate the additional film-forming materials in the form of solutions.

The coatings, before baking, may be air-dried for 30 minutes or longer to remove solvent under normal conditions of atmospheric temperature and humidity with good ventilation. Higher temperatures of drying may be employed, such as up to about 140° F. or more to hasten the removal of solvent.

The coating compositions of this invention are useful for applying decorative and protective coatings to articles manufactured from a variety of materials, such as wood, metal, glass, ceramics, plastics, Bakelite, and other organic and inorganic substances. The coatings are preferably of about 1 to 5 mil thickness when dry. While conventional air-spraying is the preferred method of applying the products of this invention, obviously other methods may be used, such as hot air spraying, steam spraying, electrostatic spraying, spraying a preheated coating composition, dipping, brushing, and roller-coating.

In the following examples, which are illustrative of the present invention, the parts, percentages, and ratios are by weight unless otherwise indicated. In the examples following, knife and Arco Microknife ratings are given to indicate relative adhesion of the coatings to the substrates. The lower the Microknife value the better the adhesion. Values of about 10 or higher are unacceptable. Knife values are determined by a skilled operator. The Microknife adhesion and "whiteness" values referred to in the examples are those determined in accordance with the tests described in Test Methods for Evaluation of Organic Coatings, by S. Gusman, Official Digest of the Federation of Paint and Varnish Production Clubs, pp. 3 to 23, January 1953. The higher the "whiteness" value, the greater the color. Hardness is given either as a Knoop hardness (determined on a Tukon tester) or as a Koh-I-Noor pencil value. In both cases, the higher the value, the harder the coating. The pencil hardness is also indicative of adhesion. The numerical gloss ratings represent readings made on a 60° Photovolt glossimeter made by the Photovolt Corporation. The "print" test is made by placing a piece of cheesecloth on the coating and then placing on the cheesecloth a one-pound weight having a cylindrical cross-sectional area of one square inch with the one square inch area gravitationally pressing the cheesecloth against the coating for a period of one hour while the assemblage is in an oven at 250° F. One measurement of solvent resistance herein employed is obtained by determining the pencil hardness of the coating before and immediately after soaking the coating in a particular solvent for one hour at room temperature (about 25° C.).

EXAMPLE 1

(a) A reaction vessel is charged with 1645 parts by weight of toluene which is heated to 109° to 110° C. under an atmosphere of nitrogen. With continued stirring a solution of 34.2 parts of acrylamide (Am) and 15.84 parts of benzoyl peroxide in 1550 parts of methyl methacrylate (MMA) is added gradually over a one-hour period. The polymerization mixture is recatalyzed three times at two hour intervals with 1.6 parts of benzoyl peroxide. After a total polymerization time of eight hours the heat is removed and the polymer solution is diluted to 40% solids with a mixture of 460 parts toluene and 300 parts monomethyl ether of ethylene glycol (EGME). The 40% polymer solution has a Gardner-Holdt viscosity of "R" (4.7 poises), which corresponds to a molecular weight of approximately 43,500. The intrinsic viscosity $[\eta]=0.215$.

(b) When the toluene solution of the polymer first obtained in part (a) is reduced to 40% solids with all toluene not in combination with ethylene glycol monomethyl ether, the solution has a Gardner-Holdt viscosity of "Y" (17.6 poises), a four-fold increase, rendering it extremely difficult to grind with pigment and requiring large quantities of reducing solvent to obtain sprayable viscosities and then only at low solids concentrations which result in very thin films.

(c) To 100 parts of the 40% copolymer solution of part (a), there are added 8 parts by weight of N,N'-dimethoxymethyl-N,N'-ethyleneurea, 1 part by weight of maleic acid, and 15 parts of toluene. Panels of bare steel and steel primed with epoxy resin coatings are dipped in this composition, air-dried, and baked at 300° F. for 15 minutes. The coatings are hard and glossy and have good adhesion to the panels. They have a Microknife adhesion of 3.2 and a pencil hardness of 9H. The pencil hardness after soaking one hour in 2-ethoxyethyl acetate was only reduced to 2H. A film of the homopolymer of part (b) dissolved completely in this solvent in less than 5 minutes. The print test above gave no print.

EXAMPLE 2

(a) Using the technique employed in Example 1(a), the acrylamide (Am) is replaced with 40.8 parts of methacrylamide (MAm). On reduction to 40% resin solids concentration as in Example 1(b), the Gardner-Holdt viscosity reading is "S" (5.0 poises).

(b) To 100 parts of the 40% copolymer solution of part (a), there are added 8 parts by weight of N,N'-dimethoxymethyl-N,N'-ethyleneurea, 1 part by weight of maleic acid, and 15 parts of toluene. Panels of bare steel and steel primed with epoxy resin coatings are dipped in this composition, air-dried, and baked at 300° F. for 15 minutes. The coatings are hard and glossy and have good adhesion to the panels. They have a Microknife adhesion of 5 and a pencil hardness of 7H. The pencil hardness was reduced only to 2H after soaking one hour in 2-ethoxyethyl acetate. The print test above gave no print.

The following Table A lists copolymers obtained by the procedure of Example 1(a) and their viscosities (40% solution) in the solvent mixture given. The abbreviations other than those given in Examples 1 and 2 are: EA, ethyl acrylate; MA, methyl acrylate; EMA, ethyl methacrylate; Bz$_2$O$_2$, benzoyl peroxide; GH, Gardner-Holdt; BMA, n-butyl methacrylate.

This solution is then sprayed over panels of bare steel, bonderized steel, and steel coated with an epoxy resin primer. The coated panels are air-dried 15 to 30 minutes and then baked at 150° C. for 30 minutes. The coatings had a Knoop hardness of 31.8 and a Microknife adhesion value of 4.8. They had a Photovolt gloss reading of 81.8. When subjected to 400° F. for 16 hours, the Photovolt gloss value was reduced only to 72.0 and the whiteness was not appreciably diminished.

(b) When the maleic acid of part (a) is replaced with 6.3 parts of the mono-salt of maleic acid with triethylamine, similar coatings are obtained.

(c) When the maleic acid of part (a) is replaced with 3.5 parts of butylphosphoric acid, the stability is greatly reduced so that the shelf-life is less than 2 weeks whereas the composition of part (a) has a shelf-life of over 4

Table A

| Example | Monomers | Mole, Percent | Percent Bz$_2$O$_2$ (On Wt. Monomer) | Solvent | | Viscosity of 40% resin solution | |
| --- | --- | --- | --- | --- | --- | --- | --- |
| | | | | Mixture | Proportions By Weight | GH | Poises |
| 3 | MMA/EA/Am | 65:30:5 | 1.0 | Toluene/EGME | 87:13 | S | 5.0 |
| 4 | MMA/MA/Am | 65:30:5 | 1.0 | do | 87:13 | S | 5.0 |
| 5 | MMA/EMA/Am | 50:45:5 | 1.0 | do | 87:13 | T | 5.5 |
| 6 | MMA/Am | 97.5:2.5 | 1.0 | do | 87:13 | V | 8 |
| 7 | MMA/MAm | 96:4 | 1.0 | Xylene/EGME | 80:20 | U | 6.3 |
| 8 | MMA/BMA/EA/Am | 65:10:22:3 | 1.0 | 2-ethoxyethyl acetate/EGME | 95:5 | U | 6.3 |
| Control | MMA | 100 | 0.5 | Toluene/EGME | 87:13 | U | 6.3 |

To 100 parts of each of the 40% copolymer solutions of Examples 3 to 8 inclusive, there are added 8 parts by weight of N,N'-dimethoxymethyl-N,N'-ethyleneurea and 1 part by weight of maleic acid, and 15 parts of toluene (Examples 1 to 6), xylene (Example 7), or 2-ethoxyethyl acetate (Example 8). Panels of bare steel and steel primed with epoxy resin coatings are dipped in these compositions, air-dried, and baked at 300° F. for 15 minutes. The coatings are hard and glossy and have good adhesion to the panels. Table B gives test values for these coatings.

months. The adhesion is much less also. On bare steel, the Microknife adhesion is 18.4, whereas on primed steel (epoxy resin primer) it is 17.0. The Photovolt gloss is 70.0. The whiteness is 11.8, whereas that of coatings obtained from the composition in part (a) is 6.9.

(d) When the maleic acid is replaced with even as little as 0.88 part of the p-toluenesulfonic acid, the shelf-life becomes less than 24 hours, the Microknife adhesion on bare steel is 18.0 and on epoxy-resin-primed steel is 16.5, the Photovolt gloss is way down to 66, and the whiteness is 14.0.

Table B

| Example | Microknife Adhesion | Print | Gloss | Solvent-Res. (2-ethoxyethyl acetate) Pencil Hardness | | Knoop Hardness Number |
| --- | --- | --- | --- | --- | --- | --- |
| | | | | Before | After | |
| 3 | 4.9 | Faint | 86 | 4H | 2H | 21 |
| 4 | 4.4 | do | 83 | 4H | 2H | 22.5 |
| 5 | 4.7 | do | 81 | 5H | HB | 27.1 |
| 6 | 5.1 | None | 80 | 9H | 3H | 31.8 |
| 7 | 6.0 | do | 79 | 8H | 2H | 30.4 |
| 8 | 5.1 | Faint | 80 | 2H | 2B | 23.7 |
| Control | >16 | Adhered Completely | 80 | Dissolved | | 28 |

EXAMPLE 9

(a) To 135 parts of the 40% copolymer solution of Example 1(a), there is added 135 parts of TiO$_2$ and 30 parts of 2-ethoxyethyl acetate and the mixture is then passed through a roller mill three times. Then 260 parts of the resulting paste is let down with 302.5 parts of the 40% copolymer solution of Example 1(a) and there are then mixed in 17.5 parts of N,N'-bis-methoxymethyl-N,N'-ethyleneurea and 3.5 parts of maleic acid. This mixture is then reduced to spraying viscosity with 100 parts of a mixture of 3 parts xylene to one part 2-ethoxyethyl acetate. The viscosity is then 63 seconds (No. 4 Ford cup) and the composition contains 42.9% total solids.

EXAMPLE 10

To 135 parts of the 40% copolymer solution of Example 1(a), there is added 135 parts of TiO$_2$ and the mixture is passed through the roller mill and let down with the 40% polymer solution of Example 2 as described in Example 9(a). There are then mixed in 17.5 parts of N,N'-bis-methoxymethyl-uron and 3.5 parts of maleic acid. After reducing to spraying viscosity with 100 parts of a mixture of 3 parts xylene to one part 2-ethoxyethyl acetate, the viscosity is 65 seconds (No. 4 Ford cup) and the composition contains 41.5% total solids.

This solution is sprayed over panels of bare steel, bonderized steel, and steel coated with an epoxy primer and air-dried before baking at 150° C. for 30 minutes. The resultant coatings had a Knoop hardness of 30.6, and a Microknife adhesion of 4.0. They had a Photovolt gloss reading of 79.4. When subjected to 400° F. for 16 hours, the Photovolt gloss reading was reduced only to 71.0 and the whiteness was not appreciably diminished.

EXAMPLE 11

To 135 parts of the 40% copolymer solution of Example 1(a), there is added 10 parts of carbon black and 20 parts of 2-ethoxyethyl acetate and the mixture is then passed through a roller mill three times. Then 150 parts of the resulting paste is let down with 240 parts of the 40% polymer solution of Example 1(a) and there are then admixed 15.0 parts of N,N'-bis-methoxymethyl-N,N'-ethyleneurea and 3.0 parts of maleic acid. This mixture is then reduced to spraying viscosity with 110 parts of a mixture of 3 parts xylene to one part 2-ethoxyethyl acetate. The viscosity is then 65 seconds (No. 4 Ford cup) and the enamel contains 34.2% total solids. Coatings on bare steel and primed steel having good adhesion and hardness are obtained as in Example 9(a).

EXAMPLE 12

The 135 parts of TiO$_2$ described in Example 9(a) are replaced with an equal weight of red iron oxide pigment. The final viscosity is 60 seconds (No. 4 Ford cup) and the enamel contains 42.9% solids. Coatings on bare steel and primed steel having good adhesion and hardness are obtained as in Example 9(a).

EXAMPLE 13

The procedure of Example 1(a) is followed for the preparation of a copolymer of 97 mole percent of methyl methacrylate with 3 mole percent of acrylamide using ½% of benzoyl peroxide on the total weight of monomers. The copolymer obtained has an intrinsic viscosity of 0.269 and the Gardner-Holdt viscosity in a 40% solution prepared as in Example 1(a) with toluene and the monomethyl ether of ethylene glycol is Z5 (about 100 poises). Coatings prepared from compositions obtained from this copolymer by mixing 20% by weight of N,N'-dimethoxymethyl-N,N'-ethyleneurea, maleic acid, and toluene as in Example 1(c) are hard and glossy. They have a Microknife adhesion value of 3.3. They are insoluble in 2-ethoxyethyl acetate and show no print when subjected to the print test above.

EXAMPLE 14

A copolymer was prepared as in Example 13 except the proportion of benzoyl peroxide is reduced to 0.3%. The intrinsic viscosity of the polymer obtained is 0.310. Coatings obtained from the copolymer in conjunction with the ethyleneurea derivative prepared as in Example 1(c) show a Microknife adhesion value of 3.3. They are insoluble in 2-ethoxyethyl acetate and show no print when subjected to the print test.

It is to be understood that changes and variations may be made without departing from the spirit and scope of the invention as defined by the appended claims.

We claim:

1. A coating composition comprising a solution of (1) a copolymer of at least about 50 mole percent of methyl methacrylate and 2.5 to 8 mole percent of an amide of the formula

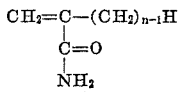

in which $n$ is an integer having a value of 1 to 2, and (2) a compound selected from the group consisting of N,N'-bis-methoxymethyl-N,N'-ethyleneurea and N,N'-bis-methoxymethyl-uron in an amount of 10% to 20% by weight of the copolymer in a solvent comprising (a) 80% to 95% by weight of at least one member selected from the group consisting of toluene, xylenes, and 2-ethoxyethyl acetate and (b) 20% to 5% respectively of the monomethyl ether of ethylene glycol.

2. A coating composition comprising a solution of (1) a copolymer of at least about 50 mole percent of methyl methacrylate and 2.5 to 8 mole percent of an amide of the formula

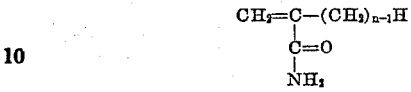

in which $n$ is an integer having a value of 1 to 2, (2) a compound selected from the group consisting of N,N'-bis-methoxymethyl-N,N'-ethyleneurea and N,N'-bis-methoxymethyl-uron in an amount of 10% to 20% by weight of the copolymer, and (3) about ½% to 4% by weight of maleic acid based on the weight of copolymer in a solvent comprising (a) 80% to 95% by weight of at least one member selected from the group consisting of toluene, xylenes, and 2-ethoxyethyl acetate and (b) 20% to 5% respectively of the monomethyl ether of ethylene glycol.

3. A coating composition comprising a solution of (1) a copolymer of at least about 50 mole percent of methyl methacrylate and 2.5 to 8 mole percent of acrylamide, and (2) a compound selected from the group consisting of N,N'-bis-methoxymethyl-N,N'-ethyleneurea and N,N'-bis-methoxymethyl-uron in an amount of 10% to 20% by weight of the copolymer in a solvent comprising (a) 80% to 95% by weight of at least one member selected from the group consisting of toluene, xylenes, and 2-ethoxyethyl acetate and (b) 20% to 5% respectively of the monomethyl ether of ethylene glycol.

4. A coating composition comprising a solution of (1) a copolymer of at least about 50 mole percent of methyl methacrylate and 2.5 to 8 mole percent of acrylamide, and (2) N,N'-bis-methoxymethyl-N,N'-ethyleneurea in an amount of 10% to 20% by weight of the copolymer in a solvent comprising (a) 80% to 95% by weight of at least one member selected from the group consisting of toluene, xylenes, and 2-ethoxyethyl acetate and (b) 20% to 5% respectively of the monomethyl ether of ethylene glycol.

5. A coating composition comprising a solution of (1) a copolymer of at least about 50 mole percent of methyl methacrylate and 2.5 to 8 mole percent of acrylamide, (2) N,N'-bis-methoxymethyl-N,N'-ethyleneurea in an amount of 10% to 20% by weight of the copolymer, and (3) about ½% to 4% by weight of maleic acid based on the weight of copolymer in a solvent comprising (a) 80% to 95% by weight of at least one member selected from the group consisting of toluene, xylenes, and 2-ethoxyethyl acetate and (b) 20% to 5% respectively of the monomethyl ether of ethylene glycol.

6. A coating composition comprising a solution of (1) a copolymer of at least about 50 mole percent of methyl methacrylate and 2.5 to 8 mole percent of acrylamide, (2) N,N'-bis-methoxymethyl-N,N'-ethyleneurea in an amount of 10% to 20% by weight of the copolymer, and (3) about ½% to 4% by weight of maleic acid based on the weight of copolymer in a solvent comprising a mixture of 80 to 95 parts by weight of toluene and 20 to 5 parts by weight respectively of the monomethyl ether of ethylene glycol.

7. A coating composition comprising a solution of (1) a copolymer of at least about 50 mole percent of methyl methacrylate and 2.5 to 8 mole percent of acrylamide, (2) N,N'-bis-methoxymethyl-N,N'-ethyleneurea in an amount of 10% to 20% by weight of the copolymer, and (3) about ½% to 4% by weight of maleic acid based on the weight of copolymer in a solvent comprising a mixture of 80 to 95 parts by weight of xylene and 20 to 5 parts by weight respectively of the monomethyl ether of ethylene glycol.

8. A coating composition comprising a solution of (1) a copolymer of at least about 50 mole percent of methyl methacrylate and 2.5 to 8 mole percent of acrylamide, (2) N,N'-bis-methoxymethyl-N,N'-ethyleneurea in an amount of 10% to 20% by weight of the copolymer, and (3) about ½% to 4% by weight of maleic acid based on the weight of copolymer in a solvent comprising a mixture of 80 to 95 parts by weight of 2-ethoxyethyl acetate and 20 to 5 parts by weight respectively of the monomethyl ether of ethylene glycol.

9. A coating composition comprising a solution of (1) a copolymer of at least about 50 mole percent of methyl methacrylate and 2.5 to 8 mole percent of acrylamide, (2) N,N'-bis-methoxymethyl-uron in an amount of 10% to 20% by weight of the copolymer, and (3) about ½% to 4% by weight of maleic acid based on the weight of copolymer in a solvent comprising a mixture of 80 to 95 parts by weight of toluene and 20 to 5 parts by weight respectively of the monomethyl ether of ethylene glycol.

10. A coating composition comprising of (1) a copolymer of at least about 50 mole percent of methyl methacrylate and 2.5 to 8 mole percent of methylacrylamide, and (2) N,N'-bis-methoxymethyl-N,N'-ethyleneurea in an amount of 10% to 20% by weight of the copolymer in a solvent comprising (a) 80% to 95% by weight of at least one member selected from the group consisting of toluene, xylenes, and 2-ethoxyethyl acetate and (b) 20% to 5% respectively of the monomethyl ether of ethylene glycol.

11. A coating composition comprising a solution of (1) a copolymer of at least about 50 mole percent of methyl methacrylate and 2.5 to 8 mole percent of methylacrylamide, (2) N,N'-bis-methoxymethyl-N,N'-ethyleneurea in an amount of 10% to 20% by weight of the copolymer, and (3) about ½% to 4% by weight of maleic acid based on the weight of copolymer in a solvent comprising a mixture of 80 to 95 parts by weight of toluene and 20 to 5 parts by weight respectively of the monomethyl ether of ethylene glycol.

12. An article comprising a solid substrate carrying adhered to at least one surface thereof a coating comprising the reaction product of a copolymer of at least about 50 mole percent of methyl methacryalte and 2.5 to 8 mole percent of an amide of the formula

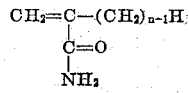

in which $n$ is an integer having a value of 1 to 2, and a compound selected from the group consisting of N,N'-bis-methoxymethyl-N,N'-ethyleneurea and N,N'-bis-methoxymethyl-uron.

13. An article as defined in claim 12 in which the substrate is a metal.

14. A process which comprises applying to a surface of a solid substrate a coating composition comprising a solution of (1) a copolymer of at least about 50 mole percent of methyl methacrylate and 2.5 to 8 mole percent of an amide of the formula

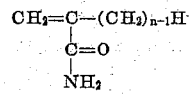

in which $n$ is an integer having a value of 1 to 2, (2) a compound selected from the group consisting of N,N'-bis-methoxymethyl-N,N'-ethyleneurea and N,N'-bis-methoxymethyl-uron in an amount of 10% to 20% by weight of the copolymer, and (3) about ½% to 4% by weight of maleic acid based on the weight of copolymer in a solvent comprising (a) 80% to 95% by weight of at least one member selected from the group consisting of toluene, xylenes, and 2-ethoxyethyl acetate and (b) 20% to 5% respectively of the monomethyl ether of ethylene glycol, and drying and baking the coated article at a temperature of 250° F. to 350° F.

15. An article comprising a metal base, a baked primer coating thereon, and, adhered to the primer, a coating comprising the reaction product of a copolymer of at least about 50 mole percent of methyl methacrylate and 2.5 to 8 mole percent of an amide of the formula

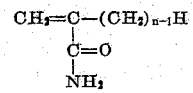

in which $n$ is an integer having a value of 1 to 2, and a compound selected from the group consisting of N,N'-bis-methoxymethyl-N,N'-ethyleneurea and N,N'-bis-methoxymethyl-uron.

References Cited in the file of this patent
UNITED STATES PATENTS

| | | |
|---|---|---|
| 2,373,135 | Maxwell | Apr. 10, 1945 |
| 2,373,136 | Hoover et al. | Apr. 10, 1945 |
| 2,386,347 | Roland | Oct. 9, 1945 |
| 2,491,102 | Frowde | Dec. 13, 1949 |
| 2,578,665 | Bjorksten et al. | Dec. 18, 1951 |

OTHER REFERENCES

"Elvanol" Polyvinyl Alcohols, published by Du Pont (1947), pages 34–35.